United States Patent [19]

Kazuo et al.

[11] 4,180,591

[45] Dec. 25, 1979

[54] METHOD OF PRODUCING A SOY SAUCE

[75] Inventors: Yamashita Kazuo, Yotsukaichi; Kuroyanagi Koji, Suzuka; Minamikawa Yoshitsugu, Suzuka; Tanabe Yasuhiro, Suzuka, all of Japan

[73] Assignee: Shono Denpun Kabushiki Kaisha, Suzuka, Japan

[21] Appl. No.: 819,204

[22] Filed: Jul. 26, 1977

[30] Foreign Application Priority Data

Oct. 28, 1976 [JP] Japan ................................ 51-129759

[51] Int. Cl.$^2$ .............................................. A23L 1/238
[52] U.S. Cl. ........................................ 426/18; 426/44; 426/46; 426/48; 426/49; 426/52; 426/60; 426/589
[58] Field of Search ...................... 426/18, 44, 46, 48, 426/49, 52, 60, 589, 650

[56] References Cited

U.S. PATENT DOCUMENTS

| | | | |
|---|---|---|---|
| 1,332,448 | 3/1920 | Satow | 426/18 |
| 2,444,577 | 7/1948 | Murata | 426/589 |
| 3,495,991 | 2/1970 | Magi et al. | 426/48 X |
| 3,830,939 | 8/1974 | Sakasai et al. | 426/46 |
| 3,914,436 | 10/1975 | Nakadai et al. | 426/589 X |

FOREIGN PATENT DOCUMENTS

20520 of 1911 United Kingdom ..................... 426/589

*Primary Examiner*—Alvin E. Tanenholtz
*Assistant Examiner*—Esther M. Kepplinger
*Attorney, Agent, or Firm*—Lawrence I. Field

[57] ABSTRACT

A novel light-brown seasoning liquor with high nitrogen and alcohol contents, and a method for producing the same by using, as the main raw material, a protein aqueous solution or dispersion which contains starch and is obtained from corn. The production method comprises the steps of: performing lactic fermentation by adding lactic acid bacteria to the raw material, then pasteurizing it, and decomposing the protein and starch by adding an enzyme solution extracted from koji with a saline solution, further performing alcohol fermentation by adding yeast, thereby finishing the fermentation and ripening within a short period of only 20-35 days. The fermented material is then filtered and sodium chloride is added to the filtrate to obtain the above seasoning liquor.

7 Claims, No Drawings

METHOD OF PRODUCING A SOY SAUCE

BACKGROUND OF THE INVENTION

This invention relates to a novel light-colored seasoning liquor and a method for producing the same.

In the conventional method for preparing a seasoning liquor by using the protein sources of soybean and wheat, the protein is hydrolyzed so as to produce the seasoning liquor. For example, the protein is hydrolyzed into amino acids by treating it with a mineral acid such as hydrochloric acid at an elevated temperature and the decomposed product is then neutralized and refined to obtain an amino acid seasoning liquor. In another method, the amino-bonds of protein are partially cut by hydrochloric acid and the product is then subjected to fermentation by adding soy sauce mash or draft soy sauce so as to produce a new-type soy sauce. In these methods, corn protein is sometimes utilized to some extent and the rate of decomposition or utilization of protein is improved as compared with the conventional totally fermenting method, and further, the production period is much reduced. However, the methods are accompanied with the formation of disagreeable substances such as levulinic acid and formic acid because the carbohydrates mixed in vegetable protein are easily hydrolyzed as compared with the protein itself, and the carbohydrates are decomposed to excess.

While, in the production of soy sauce by the conventional totally fermenting method, soybean and wheat are used as the main nitrogen sources. That is, after the heat treatment of the mixture of soybean and wheat, the mixture is inoculated with koji-mold (seed culture) and it is then incubated to obtain koji (mold preparation containing developed mycelium of koji-mold) and the fermentable mash is prepared by adding a saline solution to the koji. Thus the protein and starch contained in koji-substrate are decomposed by the protease and amylase in the koji, and further, fermentation is caused to occur by lactic acid bacteria and yeast in the koji. After the ripening of the fermenting mash, soy sauce is obtained. This method is, however, economically disadvantageous in that several months are necessary for the fermentation, in addition, the rate of utilization of the protein and starch in the employed soybean and wheat is quite low. Further, though this method is not accompanied by the formation of disagreeable substances such as levulinic acid, there is another defect that the nitrogen concentration in the product is low as compared with that of the product of hydrolyzing method.

Meanwhile, corn is more widely used for animal feed than soybean and wheat as the nitrogen source, and it is produced in large quantities at low cost. Further, the amino acid composition of corn protein very much resembles those of the protein of soybean and wheat. However, it is very hard to decompose the corn protein by enzyme so that the development of enzymatic digestion and fermentation method for producing a seasoning liquor has long been sought.

In order to eliminate the above-described defects present in the conventional art methods and to develop a novel method for producing seasoning liquor of preferable quality by using corn protein, the inventors of this application have carried out extensive studies, and as the result, the inventors have succeeded in developing a novel seasoning liquor and a method for producing the same. The seasoning liquor is prepared by decomposing the protein contained in corn protein to amino acids or peptides and by fermenting and ripening the material in a very short period of about 30 days, and the produced seasoning liquor is quite good in savor and color without containing disagreeable substances such as levulinic acid and is high in nitrogen concentration as compared with the conventional soy sauce. Details of this seasoning liquor and the producing method are disclosed in a co-pending patent application entitled "Novel Seasoning Liquor and Method for Producing the Same" as filed on the same day as United States Serial No. 819,203 the present application. The seasoning liquor disclosed in the specification of the above application has a color of dark reddish brown which corresponds to the color of dark brown soy sauce (koiguchi soy sauce).

As it is known, however, that there are other kinds of soy sauces such as light-colored soy sauce (usuguchi soy sauce) and white soy sauce (shiro soy sauce), a light-colored product of a seasoning liquor has also been desired so as to meet the taste or demand of users. Further, with regard to the conventional light-colored soy sauce, not only the color is light but also the savor is generally thin. For example, typical analysis data of a light-colored soy sauce are as follows:

Total nitrogen: —1.0–1.3%
formol nitrogen: —0.6–0.7%
alcohol: —0.1–1.0%
sugar: —2–4%
sodium chloride: —17–18%
pH: —4.7–4.9
buffer index: —1.2–1.4

SUMMARY OF THE INVENTION

Accordingly, the present invention proposes a light-colored seasoning liquor which is prepared by the decomposition with enzyme and fermentation with lactic acid bacteria and yeast by using, as the main raw material, the aqueous solution or dispersion of corn protein containing starch. The analytical values of the seasoning liquor are: total nitrogen: 1.8–2.5 W/V %, formol nitrogen: 1.1–1.6 W/V %, alcohol: 2–4 W/V %, sugar: 3.0–5.0 W/V %, sodium chloride: 15.0–18.0 W/V %, pH: 5.0–5.2, buffer index: 0.5–0.6, and color value: No. 27–28 (measured by a standard colorimeter for soy sauce according to the Japanese Agricultural Standards established by the Ministry of Agriculture and Forestry, Japanese Government).

Further the present invention proposes a method for producing the above light-colored seasoning liquor of high nitrogen and alcohol contents, in which the aqueous solution or dispersion of corn protein containing starch is used as the main raw material, and lactic fermentation is performed by adding lactic acid bacteria to the raw material thus the pH value of it is adjusted to 4.0 to 5.0 and the pH adjusted liquid is subjected to heat treatment. While, solid koji is soaked in a 20–30% saline solution of 2–4-fold quantity as much as the koji, at 0°–5° C. for at least 24 hours so as to extract the enzyme contained in the koji. This extraction is repeated at least twice and the extracted liquid containing enzyme is then concentrated to a volume of ½–¼ by ultrafiltration. This concentrated enzyme liquid is added to the above lactic fermentation liquid and yeast is further added to the latter liquid, thereby performing the decomposition of protein and starch together with alcohol fermentation.

It is, accordingly, the object of the present invention to provide a novel light-colored seasoning liquor of high nitrogen and alcohol contents with quite good savor, which liquor is produced by fermenting the raw material of corn protein.

Another object of the present invention is to provide a novel light-colored seasoning liquor which is resistant to the contamination of bacteria and molds.

A further object of the present invention is to provide a seasoning liquor which does not contain inorganic acid but contains organic acids, and is high in buffer capacity so that the savor is not so much varied when it is diluted to some extent.

Still a further object of the present invention is to provide a method for producing a novel light-colored seasoning liquor of high nitrogen and alcohol contents which is produced by using corn protein material.

Furthermore, the object of the present invention is to provide a method for producing a savory light-colored seasoning liquor of high buffer capacity by means of fermentation for a short period of time at low cost.

These and other objects, features and advantages of the present invention will become more apparent by the following description.

DETAILED DESCRIPTION OF THE INVENTION

In the method for producing a seasoning liquor of the present invention, lactic fermentation of the aqueous solution or dispersion of corn protein is firstly carried out. The aqueous solution or dispersion of corn protein generally contains 20–30% by weight of protein and 5–20% by weight of starch, however, if necessary, the method of the invention can be worked by using a thinner or a thicker solution or dispersion as compared with the above. As the lactic acid bacteria used for the lactic fermentation, the genus of Lactobacillus can be used. The lactic fermentation is generally performed at 50°–60° C. for 15–24 hours, thereby adjusting the pH at 4.0–5.0.

The liquid that is treated in the above step is then subjected to heat treatment so as to kill the bacteria. The condition of 30–60 minutes at 70°–80° C. may be sufficient for the above heat treatment.

Thus treated liquid is then supplied with an enzyme solution which is extracted from koji, and the protein and starch in the liquid is decomposed at a temperature of 30°–33° C.

This enzyme solution can be obtained through the following procedure. The quantity of koji for the preparation of enzyme solution is 2 to 4-fold as much as the quantity of the protein contained in the above aqueous solution or dispersion of corn protein. This koji is soaked in a 20–30 W/V % (hereinafter simply referred to as "%") saline solution of 3–4-fold quantity at 0°–5° C. for 24–72 hours, and the enzyme is extracted under a sterile condition. After the extract is separated from solid components, the latter residue is subjected to the second soaking and extracting at 0°–5° C. for 24–48 hours by adding 2–3-fold quantity of 20–30% saline solution. After the second extraction, the residue is rinsed with 20–30% saline solution (the recovered saline solution obtained in the concentrating process with membrane treatment, which will be described below) and this rinse solution is recovered.

By the above procedure, more than 80% of intracellular enzyme can be extracted out of the cells, further, the infectious microbes in the koji are killed by the low temperature of below 5° C. and the concentration of sodium chloride at 20–30%. Accordingly, the sterile enzyme solution can be obtained. The extracts (at least two extractions) and rinse liquid are then combined together and concentrated to ½–¼ quantity of ultrafiltration in which membrane is used for fractionating according to molecular weights. The quantity of the concentrated liquid may be adjusted to a degree such that, when the mashing is finished by adding the enzyme solution of 20–30% in sodium chloride concentration, the concentration of sodium chloride in the mash becomes 6–11%. The separated saline solution in the above ultrafiltration is used for the rinsing and soaking of koji in the next cycle.

About 24–48 hours after the addition of the enzyme solution to the above-described treated liquid, separately cultured yeast such as Saccharomyces rouxii is added as a starter (mother yeast) and the decomposition of protein and starch and alcohol fermentation are carried out at 20°–30° C. This fermentation can be finished in 20–35 days. Then, the fermented mash is filtered and sodium chloride is added to the filtrate until the concentration becomes 15–18%. It is further subjected to heat treatment at about 60°–75° C. and refined, thereby obtaining a light-colored seasoning liquor having good savor and of light brown color.

The koji used in the method of the present invention is prepared by the conventional method, in which the substrates of corn starch, wheat bran, wheat, soybean and the like are inoculated with mold starter in the presence of water. For example, the substrate of wheat for soy sauce is supplied with water (water content: about 40%) and it is inoculated with the mixture of Rhizopus delemar and Aspergillus sojae so as to produce protease and amylase. The saccharification power of such koji is quite strong. With the enzyme extracted and concentrated from the above solid koji and with halotolerant yeast (Saccharomyces rouxii), the starch in the raw material is subjected to vigorous saccharification and alcohol fermentation. In this process, more than 3% of alcohol is produced. This alcohol is quite effective not only in the prevention of coloring of the product but also in imparting good odor and savor and preservative property as compared with the case in which alcohol is added later to the same degree.

The analysis values of the light-colored seasoning liquor prepared according to the method of the present invention are, as described in the foregoing, total nitrogen: 1.8–2.5%, formol nitrogen: 1.1–1.6%, alcohol: 2–4%, sugar: 3.0–5.0% and sodium chloride: 15.0–18.0%. Further, the pH of the liquor is 5.0–5.2, buffer index is 0.5–0.6 and color value is No. 27–28 when measured by the aforementioned standard colorimeter for soy sauce.

The above-described present invention has the following quite excellent features.

In both the conventional soy sauces and the above-mentioned dark brown seasoning liquor that was invented by the same inventors and described in the above noted patent application filed on the same day as the present patent application, the color is produced by the amino-carbonyl reaction of amino acids and reducing sugar produced by decomposition. Further, it is well known fact that the pentosan in koji substrate takes part in the coloring. The inventors have carried out the decomposition and fermentation in a system scarcely containing pentosan, and as the result, the above-described novel light-colored seasoning liquor can be produced.

In the light-colored seasoning liquor of the present invention, the nitrogen concentration is high, especially, the ratio of formol nitrogen to the total nitrogen is 55–70%, and further, the ratio of glutamic acid in amino acid components is about 18%. The light-colored seasoning liquor has, therefore, quite excellent savor without the necessity of additional sodium glutamate, and though the color is light, the liquor is of good body.

The light-colored seasoning liquor of the present invention is a kind of natural seasoning of good preservative property since the decomposition of protein and starch and the alcohol fermentation are completely accomplished, in addition, the lactic fermentation is utilized with lactic acid bacteria (the genus of Lactobacillus). Accordingly it is not necessary to add any antiseptic or alcohol as fungicide.

Further, the light-colored seasoning liquor of the present invention has a large buffer capacity because only organic acids are contained without any inorganic acid, and the intermediate products of glycerol, aldehyde and esters are produced in the process of decomposition and fermentation. With the high buffer capacity, even though the seasoning liquor of the present invention is light in color, it has rich taste which does not vary when it is diluted to some extent.

The light-colored seasoning liquor of the present invention is a kind of natural food which does not contain any food additives at all such as antiseptic and coloring agent, so that there is no fear of causing health hazard by food contamination. Therefore, the use of the light-colored seasoning liquor of the present invention can be largely expected as a natural seasoning agent.

In accordance with the method of the present invention, the light-colored seasoning liquor of excellent flavor and taste can be prepared by decomposing, fermenting and ripening in a short period of only 20–35 days.

In view of the lack of protein resources for mankind in the future, the seasoning liquor of the present invention to able to vary the use of corn protein that is presently used for animal feed and is produced in large quantities at low cost.

The present invention will be further described in detail with reference to several examples.

EXAMPLE 1

Water was spread over 9 kg of wheat for soy sauce to the water content of 40% and it was inoculated with koji-mold (Rhyzopus delemar and Aspergillus sojae), then it was cultured for 48 hours to make koji. The koji was soaked in 35 lit. of 20% saline solution and extraction was performed by circulating the saline solution at 0°–5° C. After 68 hours, 28 lit. of liquid was obtained by liquid-solid separation. Then 25 lit. of 25% saline solution was added to the above wet residue and extraction was carried out for 40 hours in like manner as the above, and 25 lit. of extract was finally obtained. The residue was further rinsed twice with 10 lit. of 25% saline solution and 20 lit. of rinse solution was recovered. Then, 73 lit. of the whole recovered enzyme solution was concentrated to 30 lit. by ultrafiltration at a pressure of 10.5 kg/cm$^2$ and circulating rate of 8 lit./min with using a UF#200 membrane unit (trademark of a product of U O P, the area of membrane: 1.55 m$^2$. The rate of concentration was 15,16 lit./hr.m$^2$.

Meanwhile, a raw material protein dispersion of 80 lit. in volume containing 22.5% of protein and 15.0% of starch, was prepared by refining the corn protein dispersion obtained from corn starch production process. To this protein dispersion was added 5 lit. of cultured liquid of lactic acid bacteria (genus of Lactobacillus) and lactic fermentation was performed at 50° C. for 24 hours to obtain a fermented liquid of pH 4.0–4.5. Then the lactic acid bacteria were killed by pasteurizing at 70°–80° C. for 45 minutes. The above-described 30 lit. of enzyme solution was next added to the pasteurized product and it was maintained at 30° C. After 24 hours, 5 lit. of yeast cultured liquid (Saccharomyces rouxii) was added to it and decomposition and alcohol fermentation were performed at 30° C. for 21 days. After the fermentation, it was filtered and sodium chloride was added to the filtrate to a concentration of 17.5%. Further, it was pasteurized at 65° C. to obtain 111 lit. of product. The analysis data of the product were as follows:

| Total nitrogen | 2.23% | formol nitrogen | 1.35% |
|---|---|---|---|
| alcohol | 3.0% | reducing sugar | 3.23% |
| pH | 5.0 | color value | #27 or more |
| buffer index | 0.6 | | |

The seasoning liquor obtained in this example had the following characteristics: The tint was light reddish brown and clear. The taste of the seasoning liquor was refreshing and palatable without any disagreeable odor. With regard to preservability neither putrefaction nor denaturation was observed during 3 months' preservation. Further, in connection with anti-fungal property, 10$^5$ cells of bacteria were inoculated, however, they decreased to 10$^2$ cells after 4 weeks. With the above results, it will be understood that the light-colored seasoning liquor of the present invention is quite excellent.

EXAMPLE 2

In like manner as Example 1, koji was prepared from 13 kg of wheat for soy sauce. Extraction was carried out by soaking the koji in 50 lit. of 25% saline solution at 0°–5° C. for 48 hours. After 40 lit. of extract liquid was separated, the koji was again soaked in 40 lit. of 25% saline solution for 48 hours and another 40 lit, of extract liquid was separated. The koji was further rinsed with 10 lit. of the saline solution twice to obtain 20 lit. of rinse liquid. Thus obtained 100 lit. of recovered solution was concentrated to 30 lit. by using the same membrane unit as that of Example 1 at a pressure of 10.0 kg/cm$^2$ and circulating rate of 6 lit./min. The rate of concentration was 13.5 lit./hr.m.$^2$.

Meanwhile, a 80 lit. raw material dispersion containing 18.5% of protein and 15.0% of starch was prepared in like manner as Example 1. By using the above concentrated extract and raw material dispersion, the mashing and fermentation was carried out in the same manner as Example 1, except that the temperature was kept at 33° C. for 72 hours after the addition of enzyme solution and at 27° C. thereafter. The fermentation was terminated after 24 days. The fermented mash was then filtered and the concentration of sodium chloride was adjusted to 17.5% by adding sodium chloride to the filtrate. Then it was subjected to pasteurization at 65° C. to obtain a product of 107 lit. in volume. The results of analyses on the product were as follows:

| | | | |
|---|---|---|---|
| Total nitrogen | 1.84% | formol nitrogen | 1.12% |
| alcohol | 3.5% | reducing sugar | 4.43% |
| pH | 5.1 | color value | #27 or more |
| buffer index | 0.5 | | |

The seasoning liquor prepared in this example had the following characteristics. The tint was light reddish brown and clear. The taste of the seasoning liquor was refreshing and palatable without any disagreeable odor. With regard to preservability, neither putrefaction nor denaturation was observed during 3 months' preservation. Further, in connection with anti-fungal property, $10^5$ cells were inoculated, however, they decreased to $10^2$ cells after 4 weeks. With the above results, it will be understood that the light-colored seasoning liquor of the present invention is quite excellent.

It should be noted that the present invention may be practised with various modifications without departing from the principle of the present invention. Therefore, the present invention is by no means restricted to the above specific examples and restricted only by the appended claims.

What is claimed is:

1. A method for producing a light-colored seasoning liquor of high nitrogen and alcohol contents comprising the steps of: performing lactic fermentation by adding lactic acid bacteria to the main raw material of a corn protein aqueous solution or dispersion containing starch to convert the pH of said raw material liquid to 4.0 to 5.0, then pasteurizing said raw material liquid by heat treatment, and performing the decomposition of protein and starch for 24-48 hours by adding a concentrated enzyme solution to the product of said lactic fermentation, and further performing decomposition of protein and starch and alcohol fermentation at 20°-30° C. for 20-35 days by adding yeast to the product, said concentrated enzyme solution being prepared by extracting the enzyme contained in koji soaking the koji in 2-4 fold quantity of 20-30 wt.% saline solution at 0°-5° C. for at least 24 hours, repeating said extraction at least twice, and concentrating thus obtained extract liquids by ultra-filtration to $\frac{1}{2}$-$\frac{1}{4}$ volume.

2. A method for producing a light-colored seasoning liquor as claimed in claim 1, wherein the quantity of said koji is 2-4 times as much as the weight of protein contained in said corn protein aqueous solution or dispersion containing starch.

3. A method for producing a light-colored seasoning liquor as claimed in claim 1, wherein the decomposition of protein and starch is performed by adding said concentrated enzyme solution to said lactic fermentation product and treating it at 30°-33° C. for about 24 hours.

4. A method for producing a light-colored seasoning liquor as claimed in claim 1, wherein said corn protein aqueous solution or dispersion contains 15-30 wt.% of protein and 15-20 wt.% of starch.

5. A method for producing a light-colored seasoning liquor as claimed in claim 1, wherein said lactic acid bacteria are of the genus of Lactobacillus.

6. A method for producing a light-colored seasoning liquor as claimed in claim 1, wherein said koji is prepared by spreading water over the substrate of wheat for soy sauce and inoculating it with the mold starter of the mixture of Rhyzopus delemar and Asperigillus sojae.

7. A method for producing a light-colored seasoning liquor as claimed in claim 1, wherein said yeast is Saccharomyces rouxii.

* * * * *